US006882375B2

(12) United States Patent
Kim

(10) Patent No.: US 6,882,375 B2
(45) Date of Patent: Apr. 19, 2005

(54) THIN FILM TRANSISTOR ARRAY SUBSTRATE FOR LIQUID CRYSTAL DISPLAY

(75) Inventor: Dong-Gyu Kim, Suwon (KR)

(73) Assignee: Samsung Electronics Co., Ltd., Suwon (KR)

(*) Notice: Subject to any disclaimer, the term of this patent is extended or adjusted under 35 U.S.C. 154(b) by 114 days.

(21) Appl. No.: 09/964,645

(22) Filed: Sep. 28, 2001

(65) Prior Publication Data

US 2002/0171781 A1 Nov. 21, 2002

(30) Foreign Application Priority Data

May 16, 2001 (KR) ........................................ 2001-26721

(51) Int. Cl.$^7$ ...................... G02F 1/136; H01L 29/04; H01L 31/036; H01L 31/0376; H01L 31/20
(52) U.S. Cl. .......................................... 349/43; 257/59
(58) Field of Search ............................ 257/59; 349/43; 439/43

(56) References Cited

U.S. PATENT DOCUMENTS

| 5,042,916 A | * | 8/1991 | Ukai et al. ..................... 349/55 |
| 5,182,661 A | * | 1/1993 | Ikeda et al. ..................... 349/38 |
| 6,448,579 B1 | * | 9/2002 | Lim et al. ....................... 257/59 |
| 6,525,788 B1 | | 2/2003 | Nakagawa et al. ............ 349/44 |
| 6,587,174 B1 | | 7/2003 | Nakano ....................... 349/139 |

FOREIGN PATENT DOCUMENTS

| JP | 02-310537 | * | 12/1990 | ................. 349/138 |
| JP | 2000-122097 | | 4/2000 | ........... G02F/1/136 |
| JP | 2001-147448 | | 5/2001 | ......... G02F/1/1365 |
| JP | 2001-159764 | | 6/2001 | ......... G02F/1/1365 |

\* cited by examiner

Primary Examiner—Howard Weiss
(74) Attorney, Agent, or Firm—McGuireWoods LLP

(57) ABSTRACT

A thin film transistor array substrate for a liquid crystal display includes a substrate, and a gate line assembly formed on the substrate to receive gate signals. The gate line assembly has gate lines proceeding in the horizontal direction, and gate electrodes connected to the gate lines. A storage capacitor line assembly proceeds in the horizontal direction. A gate insulating layer is formed on the substrate while covering the gate lines and the storage capacitor line assembly. A semiconductor pattern is formed on the gate insulating layer over the gate electrodes. A data line assembly is formed on the gate insulating layer. The data line assembly has data lines crossing over the gate lines to define pixel regions, source electrodes connected to the data lines while being placed on the semiconductor pattern, and drain electrodes facing the source electrodes around the gate electrodes while being placed on the semiconductor pattern. A protective layer covers the data line assembly and the semiconductor pattern with contact holes. Pixel electrodes are formed on the protective layer at the respective pixel regions such that the pixel electrodes are connected to the drain electrodes through the contact holes. The gate lines or the pixel electrodes are provided with repair members, and the repair members are partially overlapped with the front gate lines or the pixel electrodes.

38 Claims, 9 Drawing Sheets

THIN FILM TRANSISTOR ARRAY SUBSTRATE FOR LIQUID CRYSTAL DISPLAY

BACKGROUND OF THE INVENTION (a) Field of the Invention

The present invention relates to a thin film transistor array substrate for a liquid crystal display and, more particularly, to a thin film transistor array substrate having a pixel electrode to display images at unit pixel area.

(b) Description of the Related Art

Generally, a liquid crystal display has a structure where a liquid crystal is sandwiched between two substrates each having electrodes. By applying voltages to the respective electrodes, light transmission through the liquid crystal is controlled.

The liquid crystal display bears a matrix-type pixel structure with a plurality of pixels, and a pixel electrode is formed at each pixel region. The pixel electrode is driven by driving signals applied thereto via wiring lines. The pixel regions are defined by the crossing of gate lines and data lines. The gate lines and the data lines are connected to the pixel electrodes via switching circuits such as thin film transistors (TFTs). The switching circuit controls the picture signals applied to the pixel electrode based on the scanning signals from the gate line. A storage capacitor line is provided at each pixel region to form a storage capacitor together with the pixel electrode. The storage capacitor stores the present pixel signals applied to the pixel electrode until the arrival of subsequent pixel signals.

In the process of fabricating the above-structured thin film transistor array substrate, pixel defects are liable to be generated, causing increased production cost. Among such pixel defects, the white defect is easily visible to naked eyes because the pixel is displayed constantly bright. Therefore, it is preferable that the white defect should be shifted into a black defect where the pixel is displayed to be constantly dark.

The white defect is caused by contact failure between the pixel electrode and the switching element, or malfunction of the switching element. A dark image is initially displayed and, as time passes by, current leaks at the pixel electrode so that the pixel voltage is approximated up to the common voltage of the common electrode facing the pixel electrode. This results in a white defect.

Furthermore, the white defect may be caused by short circuit between the data line and the pixel electrode due to the residual conductive material, or short circuit between the pixel electrode and the common electrode.

Among the techniques of repairing such a white defect into a black defect, there is a technique where the pixel electrode is short-circuited with the gate line that is overlapped with the pixel electrode while receiving gate signals from the gate line. In this case, the gate line transmits the gate signals to the switching circuits of the neighboring pixel line. The gate line is overlapped with the pixel electrodes, thereby functioning as a part of storage capacitor.

However, in a liquid crystal display separately having a storage wiring line being provided to form storage capacitors while being overlapped with the pixel electrodes, because the common voltage is transmitted to the separate storage wiring line, there is still a possibility of white defect even with short-circuiting between the storage wiring line and the pixel electrodes.

SUMMARY OF THE INVENTION

It is an object of the present invention to provide a thin film transistor array substrate for a liquid crystal display which has a pixel structure capable of repairing a white defect while bearing a separate storage line assembly.

This and other objects may be achieved by a thin film transistor array substrate for a liquid crystal display with the following features.

The thin film transistor array substrate is provided with repair members such that they are overlapped with the previous gate lines transmitting gate signals to pixel regions of a previous row. Here, the repair members are extended from pixel electrodes or gate lines, respectively.

Specifically, the thin film transistor array substrate includes a substrate, and a gate line assembly formed on the substrate to receive gate signals. The gate line assembly has gate lines proceeding in the horizontal direction, and gate electrodes connected to the gate lines. A storage capacitor line assembly proceeds in the horizontal direction to receive common voltages. A gate insulating layer is formed on the substrate while covering the gate lines and the storage capacitor line assembly. A semiconductor pattern is formed on the gate insulating layer over the gate electrodes. A data line assembly is formed on the gate insulating layer. The data line assembly has data lines crossing over the gate lines to define pixel regions, source electrodes connected to the data lines while being placed on the semiconductor pattern, and drain electrodes facing the source electrodes around the gate electrodes while being placed on the semiconductor pattern. A protective layer covers the data line assembly and the semiconductor pattern while bearing first and second contact holes. Pixel electrodes are formed on the protective layer at the respective pixel regions such that the pixel electrodes are connected to the drain electrodes through the first contact holes. The gate lines or the pixel electrodes are provided with repair members, and the repair members are partially overlapped with the front gate lines or the pixel electrodes.

The thin film transistor array substrate may further include storage capacitor conductive patterns overlapped with the storage capacitor line assembly while interposing the gate insulating layer. The storage capacitor conductive patterns are connected to the pixel electrodes through the second contact holes.

The storage capacitor line assembly may include double storage capacitor electrode lines horizontally formed at the top and the bottom of each pixel region, and storage capacitor electrodes vertically formed at the periphery of the pixel region while interconnecting the storage capacitor electrode lines.

The parts of the gate lines overlapped with the repair members preferably have a width smaller than other parts thereof.

The thin film transistor array substrate may further include subsidiary repair members disposed between the repair members and the gate lines. The subsidiary repair members are preferably placed at the same plane as the data line assembly.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or the similar components.

DETAILED DESCRIPTION OF THE PREFERRED EMBODIMENTS

Preferred embodiments of this invention will be explained with reference to the accompanying drawings.

Figure 1:
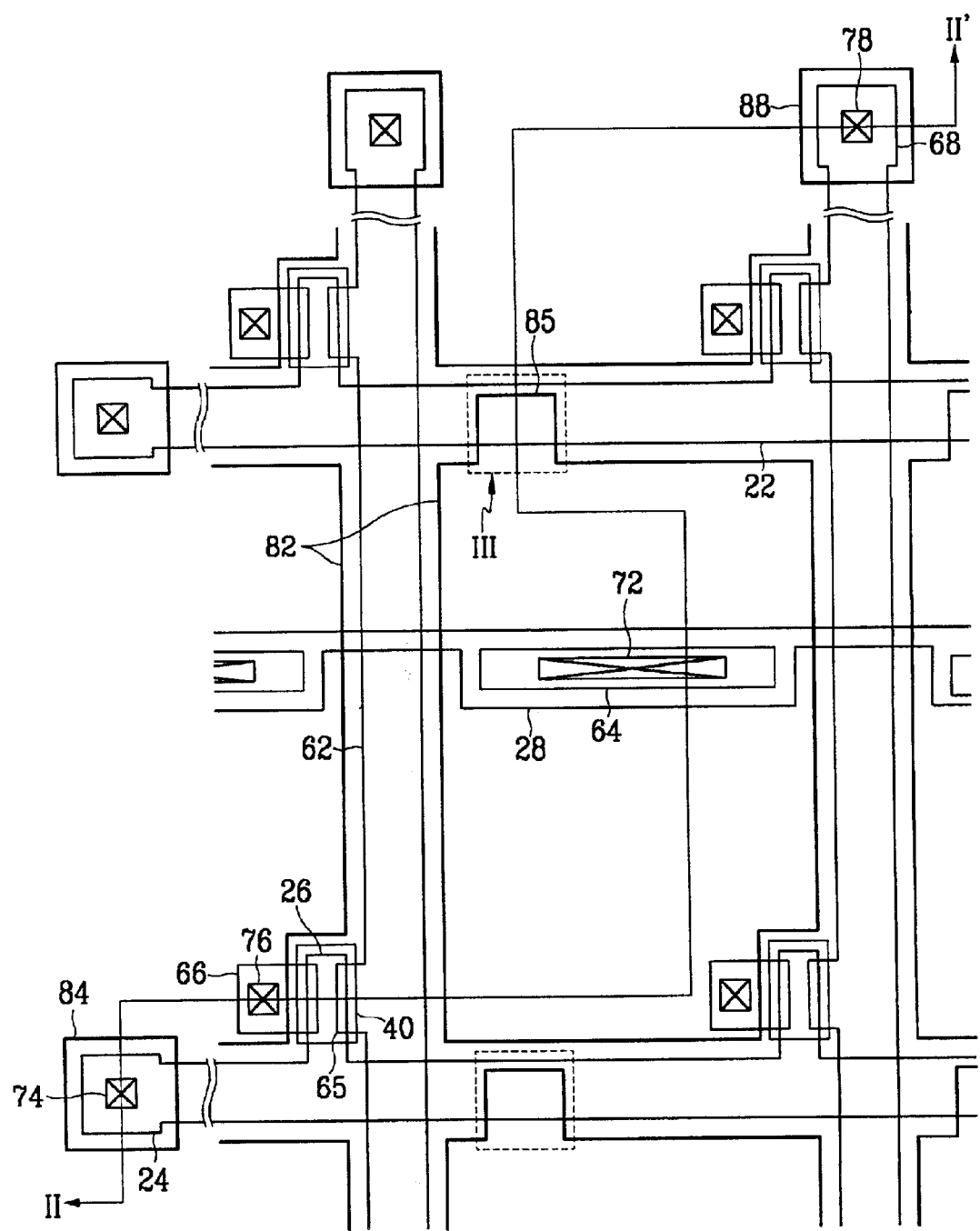
FIG. 1 is a plan view of a thin film transistor array substrate for a liquid crystal display according to a first preferred embodiment of the present invention.
Figure 2:
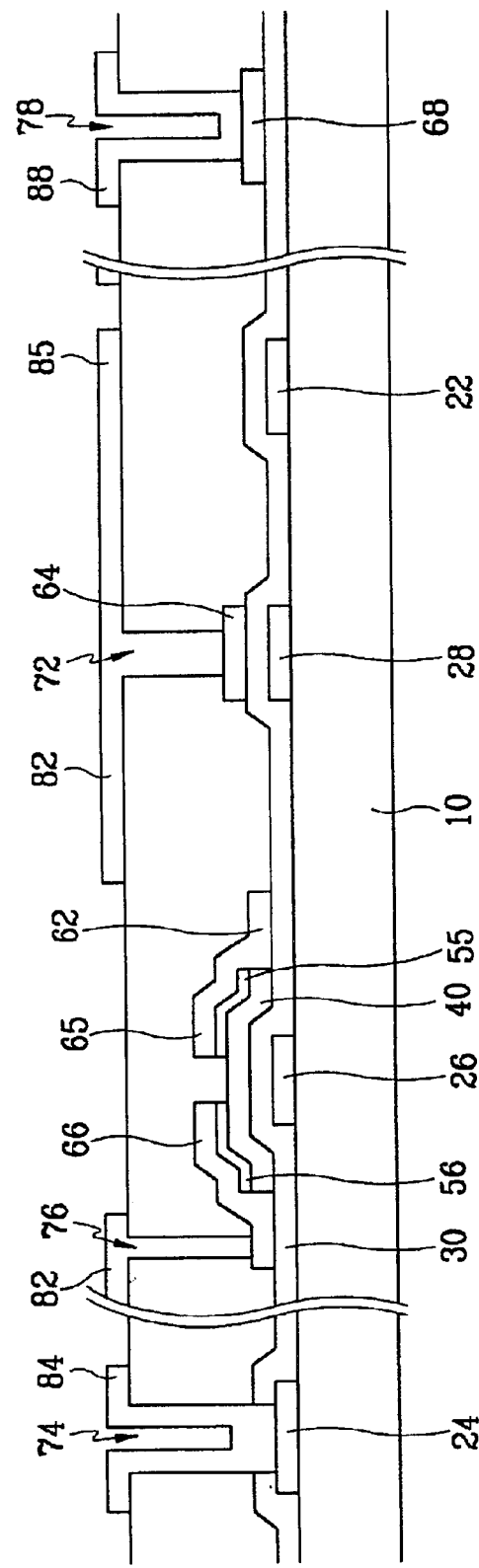
FIG. 2 is a cross sectional view of the thin film transistor array substrate taken along the II–II' line of FIG. 1.

FIG. 1 is a plan view of a thin film transistor array substrate for a liquid crystal display according to a first preferred embodiment of the present invention, and FIG. 2 is a cross sectional view of the thin film transistor array substrate taken along the II–II' line of FIG. 1.

As shown in the drawings, a gate line assembly and storage capacitor lines 28 with a single or multiple-layered structure are formed on an insulating substrate 10 of an aluminum-based conductive material. The gate line assembly includes gate lines 22 proceeding in the horizontal direction, gate pads 24 connected to ends of the gate lines 22 to receive gate signals from the outside and transmit them to the gate lines 22, and gate electrodes 26 for thin film transistors connected to the gate lines 22. The storage capacitor lines 28 proceed in the horizontal direction while being overlapped with storage capacitor conductive patterns 64 to be electrically connected to pixel electrodes 82, thereby forming storage capacitors. Common voltages that are applied to a common electrode of a counter substrate (not shown) facing the insulating substrate 10 are applied to the storage capacitor lines 28. In case the gate line assembly has a multiple-layered structure, it may contain pad materials bearing a good contact characteristic with other materials. Gate signals may be transmitted to the storage capacitor lines 28.

A gate insulating layer 30 is formed on the substrate 10 with silicon nitride to cover the gate line assembly and the storage capacitor lines 28.

A semiconductor layer 40 is formed on the gate insulating layer 30 of the gate electrodes 24 with a semiconductor material such as amorphous silicon. Ohmic contact layers 55 and 56 are formed on the semiconductor layer 40 with of suicide, or n+ hydrogenated amorphous silicon where n type impurities are doped at high concentration.

A data line assembly bearing a single or multiple-layered structure is formed on the ohmic contact layers 55 and 56 and the gate insulating layer 30 with a low resistance material such as silver or aluminum. The data line assembly includes data lines 62 proceeding in the vertical direction while crossing over the gate lines 22 to form matrix-typed pixel regions, and source electrodes 65 connected to the data lines 62 while being extended over the ohmic contact layer 55. Data pads 68 are connected to one-sided ends of the data lines 62 to receive picture signals from the outside. Drain electrodes 66 are placed on the ohmic contact layer 56 opposite to the source electrodes 65 around the gate electrodes 26 while being separated from the source electrodes 65. The data line assembly may further include storage capacitor conductive patterns 64 that are overlapped with the storage capacitor lines 28, thereby forming storage capacitors.

A protective layer 70 is formed on the data line assembly and the semiconductor layer 40 exposed through the data line assembly with silicon nitride or an organic material bearing a good planarization characteristic.

The protective layer 70 is provided with contact holes 72, 76 and 78 exposing the storage capacitor conductive patterns 64, the drain electrodes 66, and the data pads 68, respectively. The protective layer 70 further has contact holes 74 exposing the gate pads 24 together with the gate insulating layer 30.

Pixel electrodes 82 are formed on the protective layer 70 at pixel regions such that they are electrically connected to the storage capacitor conductive patterns 64 and the drain electrodes 66. The pixel electrodes 82 have repair members 85 that are partially protruded while being overlapped with the neighboring front gate lines 22 for transmitting gate signals to the front pixel lines. As subsidiary gate 84 and a subsidiary data pad 88 are formed on the protective layer 70 such that they are connected to the gate pad 24 and the data pad 68 through the contact holes 74 and 78. The pixel electrodes 82, and the subsidiary gate pad 84 and the subsidiary data pad 88 are formed with a transparent conductive material such as indium tin oxide (ITO) and indium zinc oxide (IZO). The repair member 85 easily shifts the white defect occurring at the pixel when the pixel electrode 82 is floating, or receives a common voltage into a black defect nearly invisible with naked eyes. When the white defect occurs, the front gate line 22 is short-circuited with the pixel electrodes 82 through the repair members 85, and gate off voltages are applied to the pixel electrodes 82 without electric field in the normally white mode liquid crystal display. Consequently, an electric field of about 10V is formed between the pixel electrodes 82 and the common electrode, thereby shifting the white defect at the pixels into a black defect.

Figure 3:
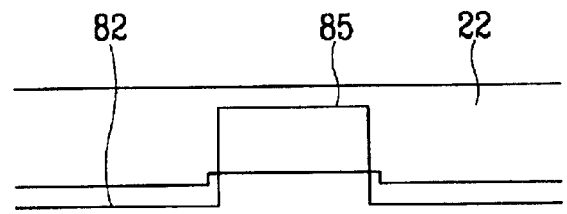
FIG. 3 is an amplified view of the thin film transistor array substrate shown in FIG. 1 at the III portion thereof.

Since the pixel electrodes 82 are formed with a transparent conductive material, it may become difficult to find the correct position of the repair members 85 during the process of repairing the pixels through short-circuiting the repair members 85 with the gate lines 22 using laser. In order to solve such a problem, it is preferable that the parts of gate lines 22 corresponding to the repair members 85 is shaped differently from other parts. For instance, as shown in FIG. 3, the part of the gate line 22 overlapped with the repair member 85 may be narrower than other parts.

Figure 4A:
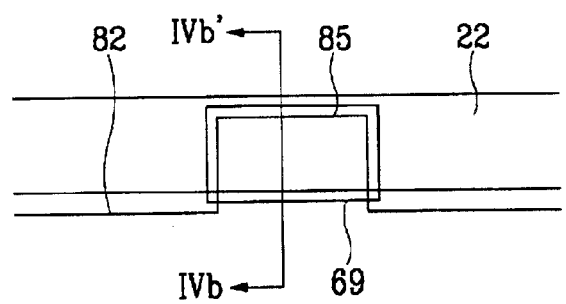
FIG. 4A illustrates a subsidiary repairing unit for the thin film transistor array substrate shown in FIG. 1.
Figure 4B:
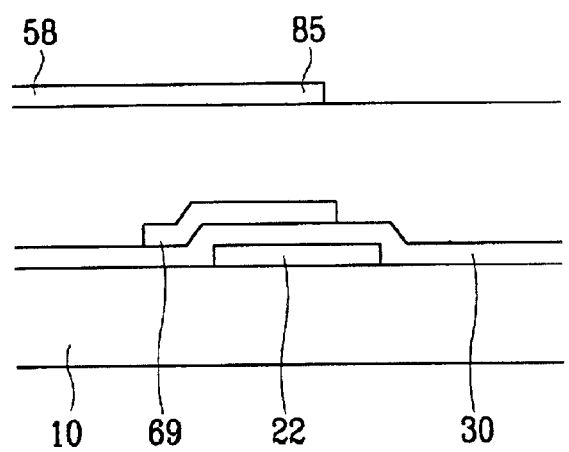
FIG. 4B is a cross sectional view of the thin film transistor array substrate taken along the IVb–IVb' line of FIG. 4A.

Furthermore, as shown in FIG. 2, the gate insulating layer 30 and the protective layer 70 are disposed between the gate lines 22 and the repair members 85. Thus, it may become difficult to short-circuit the gate lines 22 with the repair members 85 using laser. In order to solve such a problem, as shown in FIGS. 4A and 4B, subsidiary repair members 69 may be formed between the gate insulating layer 30 and the protective layer 70 at the same plane as the data line assembly. It is preferable that the subsidiary repair members 69 are partially extended external to the gate lines 22 to easily find the positions of the repair members 85.

Figure 5A:
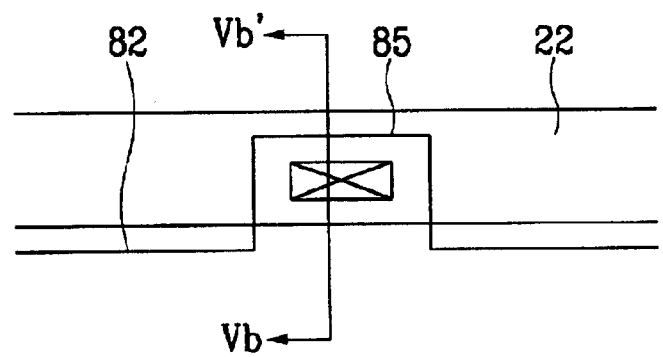
FIG. 5A illustrates a ring-shaped repairing unit for the thin film transistor array substrate shown in FIG. 1.
Figure 5B:
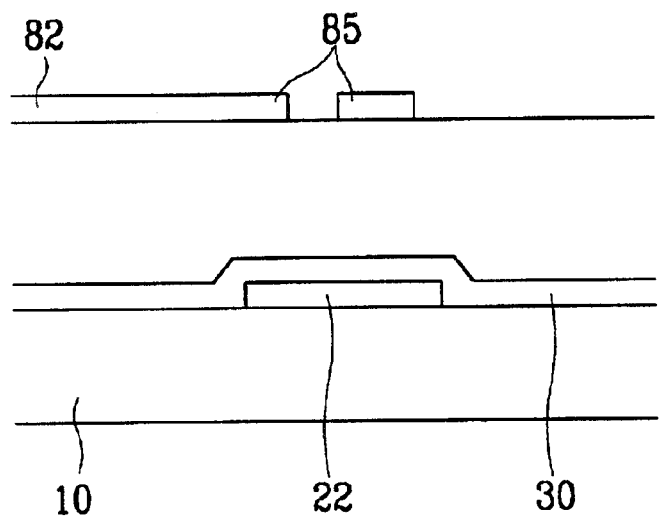
FIG. 5B is a cross sectional view of the thin film transistor array substrate taken along the Vb–Vb' line of FIG. 5A.

As shown in FIGS. 5A and 5B, the structure of the repair member 85 may be ring-shaped with a central opening portion.

Meanwhile, in order to prevent short circuit of the storage capacitor lines while improving the pixel opening ratio, the storage capacitor lines may be formed with a different structure.

Figure 6:
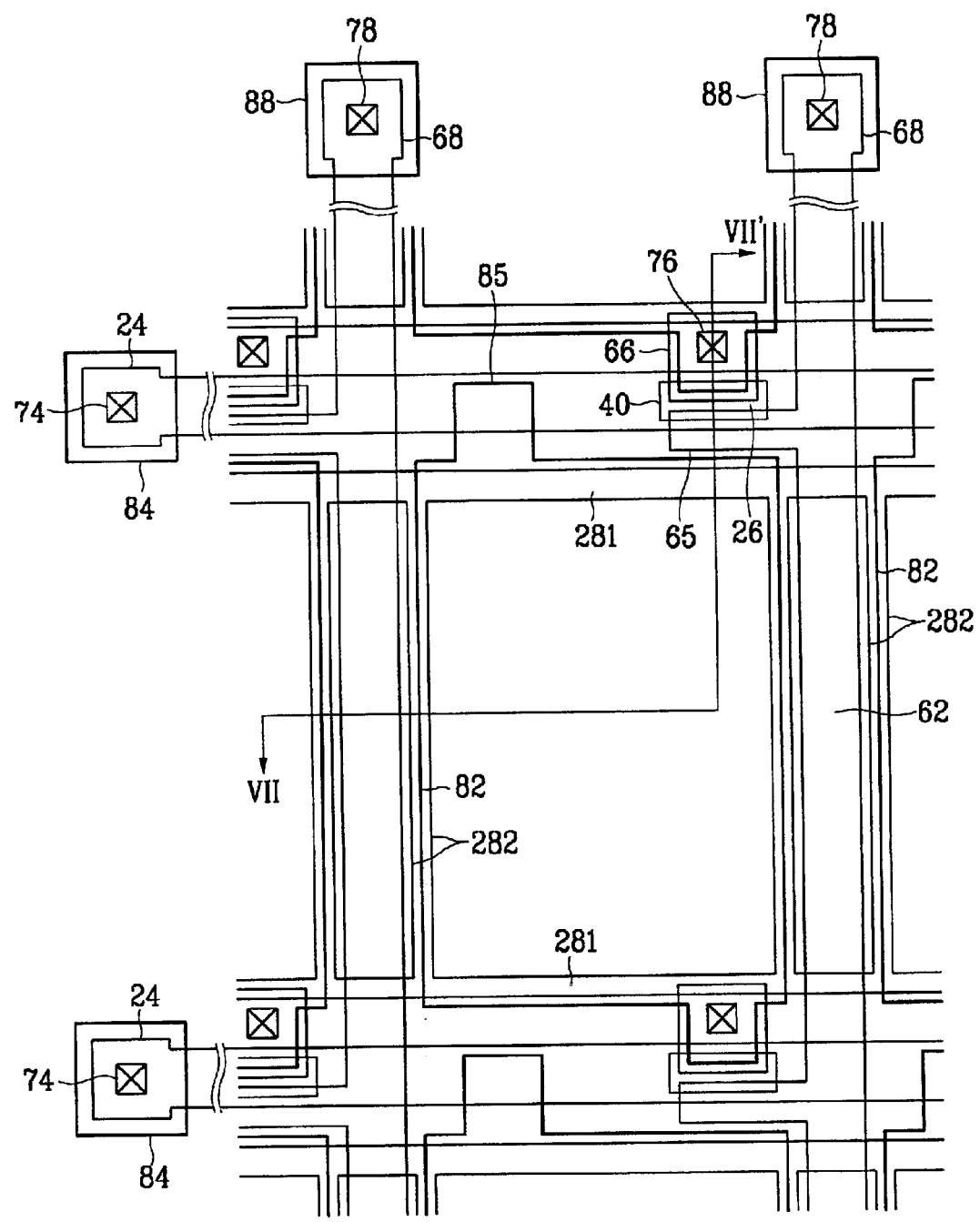
FIG. 6 is a plan view of a thin film transistor array substrate for a liquid crystal display according to a second preferred embodiment of the present invention.
Figure 7:
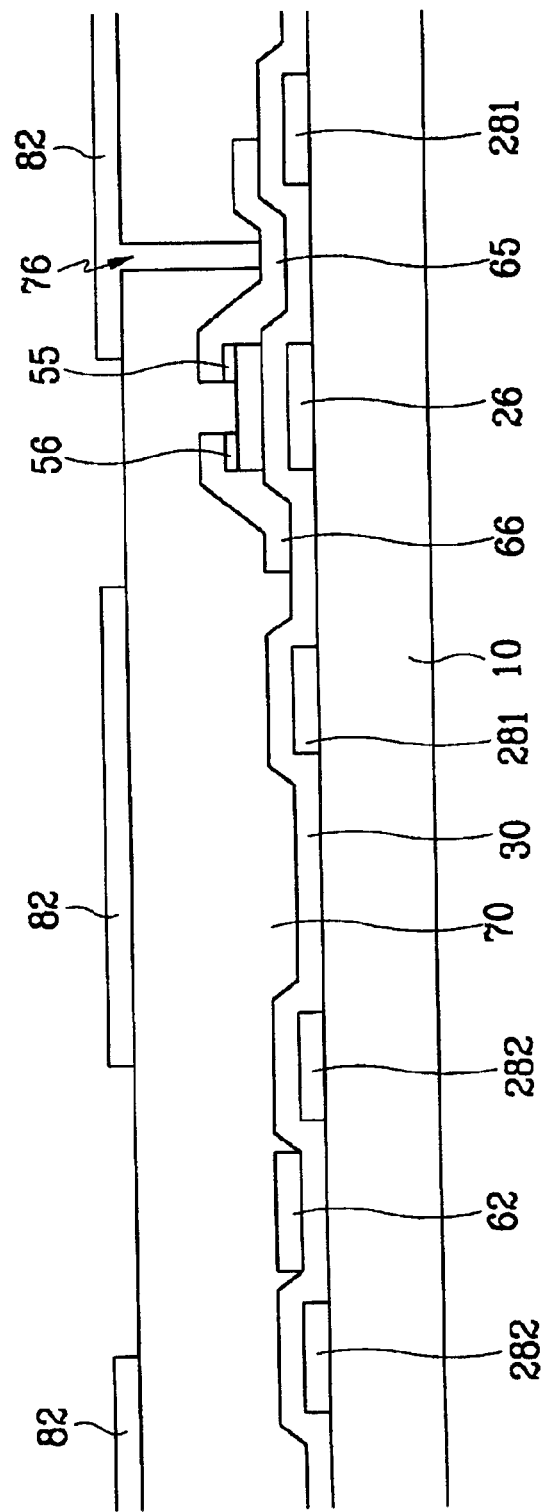
FIG. 7 is a cross sectional view of the thin film transistor array substrate taken along the VII–VII' line of FIG. 6.

FIG. 6 is a plan view of a thin film transistor array substrate for a liquid crystal display according to a second preferred embodiment of the present invention, and FIG. 7 is a cross sectional view of the thin film transistor array substrate taken along the VII–VII' line of FIG. 6. In this preferred embodiment, other components of the thin film transistor array substrate are the same as those related to the first preferred embodiment except for the following features.

The gate lines 22 are partially used as gate electrodes 26. Storage capacitor line assembly proceeds in the horizontal direction. The storage capacitor line assembly includes storage capacitor electrode lines 281 placed at the top and the bottom of the pixels, and storage capacitor electrodes 282 interconnecting the storage capacitor electrode lines 281 while proceeding in the vertical direction at the periphery of pixels. In this structure, the short circuit of the storage capacitor line assembly 281 and 282 can be prevented. Furthermore, the storage capacitor line assembly 281 and 282 is overlapped with the periphery of the pixel electrode while forming storage capacitors. This insures sufficient amount of storage capacity and opening ratio.

The semiconductor layer 40 is formed internally at the gate electrodes 26, and the source electrodes 65 proceed horizontally along the gate electrodes 26 while being extended over one side of ohmic contact layer 55. The drain electrodes 66 are formed on the otherside of ohmic contact layer 56 placed opposite to the source electrodes 65 with respect to the gate electrodes 26.

In this structure, the part of the gate line 22 overlapped with the repair member 85 may be formed narrower than other parts, and a subsidiary repair member may be provided between the repair member 85 and the gate line 22.

Meanwhile, the gate lines 22 may be partially protruded such that they bear repair members overlapped with the pixel electrodes. This structure will be explained with reference to FIGS. 8 to 10.

Figure 8:
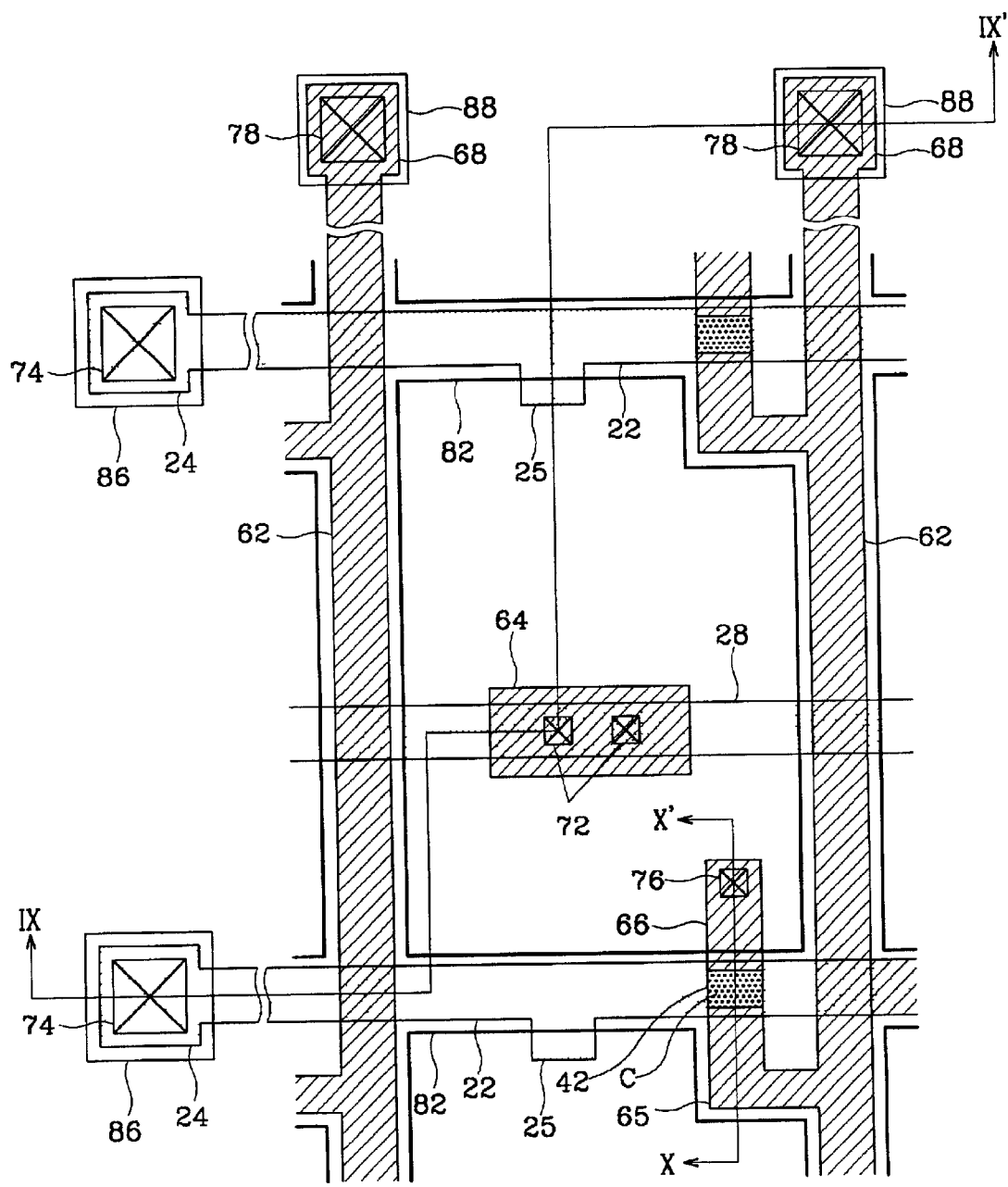
FIG. 8 is a plan view of a thin film transistor array substrate for a liquid crystal display according to a third preferred embodiment of the present invention.
Figure 9:
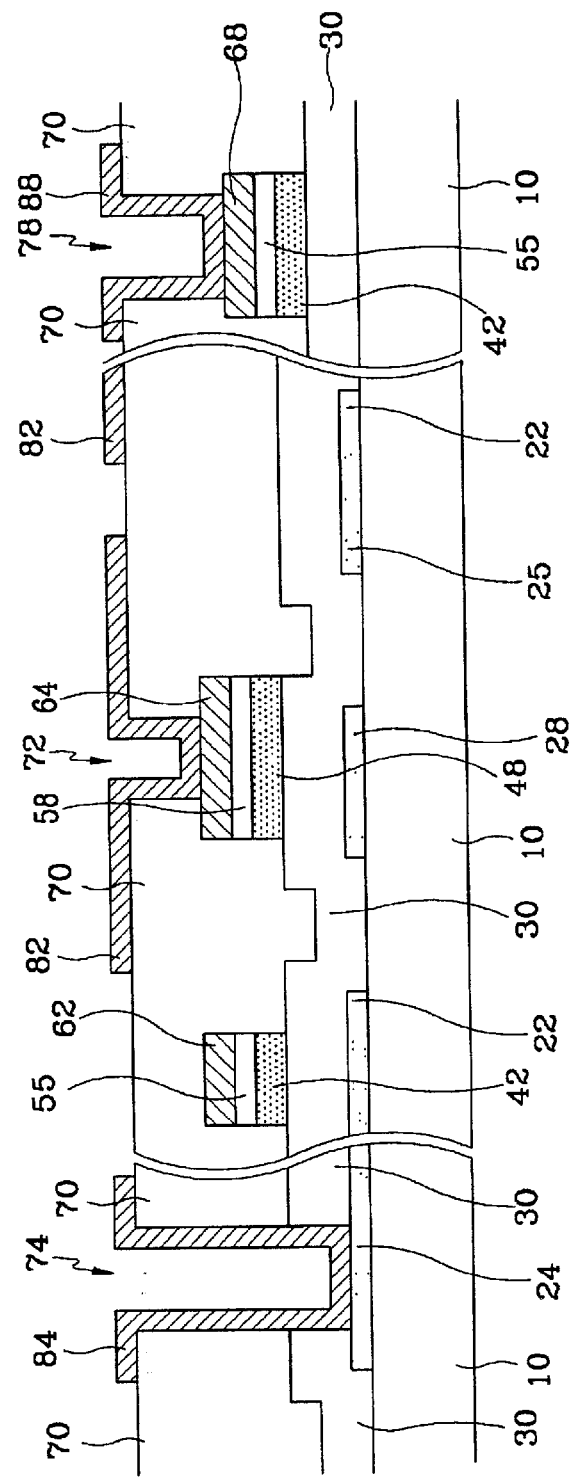
FIGS. 9 and 10 are cross sectional views of the thin film transistor array substrate taken along the IX–IX' line and X–X' line of FIG. 8, respectively.
Figure 10:
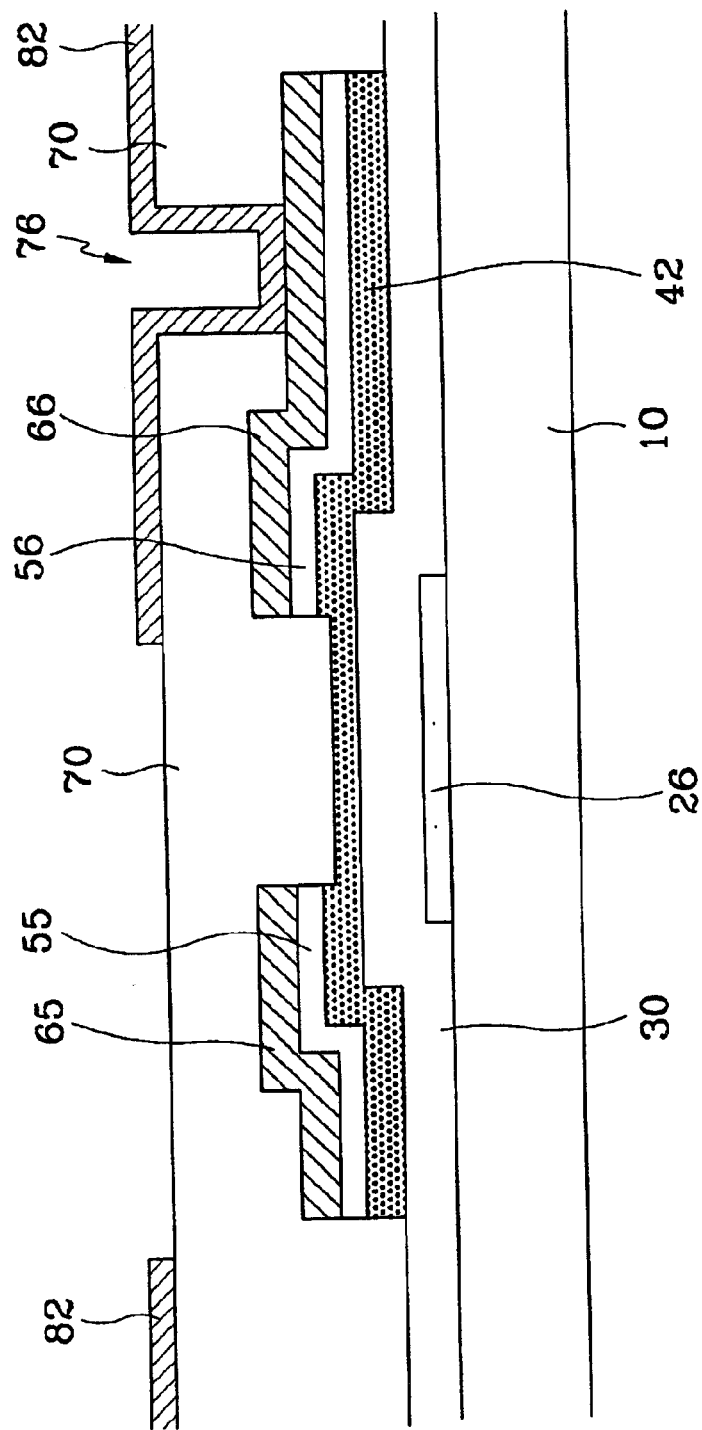

FIG. 8 is a plan view of a thin film transistor array substrate for a liquid crystal display according to a third preferred embodiment of the present invention. FIGS. 9 and 10 are cross sectional views of the thin film transistor array substrate taken along the IX–IX' line and the X–X' line of FIG. 8, respectively. In this preferred embodiment, other components of the thin film transistor array substrate are the same as those related to the first preferred embodiment except for the following features.

The front gate lines 22 that transmit gate signals to the neighboring pixels are partially protruded while overlapping the pixel electrodes 82.

Semiconductor patterns 42 and 48 are formed on the gate insulating layer 30. Ohmic contact patterns 55, 56 and 58 are formed on the semiconductor patterns 42 and 48 with amorphous silicon where n type impurities such as phosphorous (P) are doped at high concentration. The ohmic contact patterns 55, 56 and 58 lower the contact resistance between the underlying semiconductor patterns 42 and 48 and the overlying data line assembly, and bear the same outline as the data line assembly. That is, the first ohmic contact pattern 55 has the same outline as the data lines 62, the source electrodes 65 and the data pads 68, the second ohmic contact pattern 56 has the same outline as the drain electrodes 66, and the third ohmic contact pattern 58 has the same outline as the storage capacitor conductive patterns 64.

The semiconductor patterns 42 and 48 have the same outline as the data line assembly and the ohmic contact patterns 55, 56 and 58 except for the channel portions C. Specifically, the semiconductor pattern 48, the conductive pattern 64 and the ohmic contact pattern 58 for the storage capacitor have the same outline, but the semiconductor pattern 42 for the TFT differs in shape from the relevant portions of the data line assembly and the ohmic contact pattern. That is, the source and the drain electrodes 65 and 66 as well as the underlying ohmic contact patterns 55 and 56 are separated from each other at the channel portion C. However, the semiconductor pattern 42 for the TFT continuously proceeds at that channel portion C while forming a TFT channel.

As shown in FIGS. 5A and 5B, the repair member 25 may be formed with a ring shape.

As described above, in the first to third preferred embodiments of the present invention, the volume of overlapping between the repair member 85 of the pixel electrode 82 and the front gate line 22, or between the repair member 25 of the front gate line 22 and the pixel electrode 82 is preferably in the range of 5–1000 $\mu m^2$.

A method for fabricating the thin film transistor array substrate will be now explained with reference to FIGS. 1 to 7.

A silver or aluminum-based layer bearing a low resistance is deposited onto an insulating substrate 10, and patterned through photolithography to thereby form a gate line assembly 22, 24 and 26, and a storage capacitor line assembly 28, 281 and 282.

Thereafter, a silicon nitride-based gate insulating layer 30, an amorphous silicon-based semiconductor layer, and a doped amorphous silicon-based layer are sequentially deposited onto the substrate 10. The semiconductor layer, and the doped amorphous silicon-based layer are patterned to thereby form a semiconductor pattern 40 and an ohmic contact pattern on the gate insulating layer 30 over the gate electrodes 26. At this time, the semiconductor pattern 40 and the ohmic contact pattern bear the same shape.

A conductive material is then deposited onto the substrate 10, and patterned through photolithography to thereby form a data line assembly. If the required storage capacity is sufficiently obtained, the storage capacitor conductive pattern 64 may be dispensed. As shown in FIGS. 4A and 4B, subsidiary repair members 69 may be formed on the same plane as the data line assembly to easily repair the possible white defect.

The ohmic contact pattern exposed through the data line assembly is etched to thereby complete ohmic contact patterns 55 and 56 around the gate electrode 26 while exposing the semiconductor pattern 40 between them. Thereafter, oxygen plasma is preferably performed with respect to the exposed semiconductor pattern 40 to stabilize the surface thereof.

Thereafter, an insulating material such as silicon nitride or an organic material bearing low dielectric property and good planarization characteristic is deposited onto the substrate 10 to thereby form a protective layer 70. The protective layer 70 is patterned together with the gate insulating layer 30 to thereby form contact holes 72, 74, 76 and 78 exposing the storage capacitor conductive patterns 64, the gate pads 24, the drain electrodes 66 and the data pads 68, respectively. If the storage capacitor conductive patterns 64 are absent, the contact holes 72 may be omitted.

Finally, an ITO or IZO-based layer is deposited onto the protective layer 70, and patterned through a mask to thereby form pixel electrodes 82, and subsidiary gate pads 84 and subsidiary data pads 88. The pixel electrodes 82 are connected to the storage capacitor conductive patterns 64 and the drain electrodes 66 through the contact holes 72 and 76, and have repair members 85 overlapped with the gate lines 22. The subsidiary gate pads 84 and the subsidiary data pads 88 are connected to the gate pads 24 and the data pads 68 through the contact holes 74 and 78.

Meanwhile, the semiconductor patterns 42 and 48, the ohmic contact patterns 55, 56 and 58, and the data line assembly are formed through photolithography using a photoresist pattern, and this simplifies the relevant processing steps. Specifically, after forming the gate line assembly, the gate insulating layer 30, an amorphous silicon-based semiconductor layer, and a doped amorphous silicon-based layer are sequentially deposited onto the substrate 10. Thereafter, a conductive material is deposited onto the doped amorphous silicon-based layer, and a photoresist film is coated onto the conductive material-based layer. The photoresist film is then exposed to light with a mask with a light transmission control film to thereby form a photoresist pattern with partially different in thickness. The photoresist pattern has a first portion corresponding to the data line assembly, and a second portion corresponding to the channel portion with a thickness smaller than the first portion. Semiconductor patterns 42 and 48 are formed using the photoresist pattern as an etching mask. The second portion of the photoresist pattern is then removed. The conductive material-based layer placed at the channel portion is removed using the first portion of the photoresist pattern as an etching mask to thereby form a data line assembly. The doped amorphous silicon layer is removed using the data line assembly as an etching mask to thereby complete ohmic contact patterns 55, 56 and 58.

As described above, in the inventive thin film transistor array substrate for a liquid crystal display, repair members are provided at the pixel electrodes such that they overlap the front gate line, thereby making it possible to easily repair the white defect occurring at the pixel area.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A thin film transistor array substrate for a liquid crystal display, comprising:
    a substrate;
    a gate line assembly formed on the substrate and transferring gate signals, the gate line assembly comprising gate lines extending in a row direction, and gate electrodes connected to the gate lines;
    a storage capacitor line assembly extending in the row direction;
    a gate insulating layer formed on the substrate and covering the gate lines and the storage capacitor line assembly;
    a semiconductor pattern formed on the gate insulating layer over the gate electrodes;
    a data line assembly formed on the gate insulating layer, the data line assembly comprising:
        data lines crossing over the gate lines, the data lines and the gate lines define pixel regions;
        source electrodes formed on the semiconductor pattern and connected to the data lines; and
        drain electrodes formed on the semiconductor pattern and facing the source electrodes around the gate electrodes;
    a protective layer covering the data line assembly and the semiconductor pattern, the protective layer having first and second contact holes and being in direct contact with an upper surface of the semiconductor pattern between the source electrode and the drain electrode;
    pixel electrodes formed on the protective layer at the respective pixel regions such that the pixel electrodes are connected to the drain electrodes through the first contact holes; and
    repair members provided corresponding to the pixel regions,
    wherein each repair member is extended from the pixel electrode corresponding thereto and overlaps a gate line of an adjoining pixel region on a previous row.

2. The thin film transistor array substrate of claim 1, further comprising storage capacitor conductive patterns formed on the gate insulating layer and overlapping the storage capacitor line assembly, the storage capacitor conductive patterns connected to the pixel electrodes through the second contact holes.

3. The thin film transistor array substrate of claim 1, wherein the parts of the gate lines overlapping the repair members are narrower than other parts.

4. The thin film transistor array substrate of claim 1, further comprising subsidiary repair members disposed between the repair members and the gate lines.

5. The thin film transistor array substrate of claim 4, wherein the subsidiary repair members are placed on the same plane as the data line assembly.

6. The thin film transistor array substrate of claim 1, wherein the storage capacitor line assembly comprises:
    double storage capacitor electrode lines horizontally formed at the top and the bottom of each pixel region; and
    storage capacitor electrodes vertically formed at the periphery of the pixel region while interconnecting the storage capacitor electrode lines.

7. The thin film transistor array substrate of claim 1, wherein the repair member is formed with a ring shape.

8. The thin film transistor array substrate of claim 1, wherein a size of an overlapped area between the repair member and the gate line of a previous row is ranged from 5 $\mu m^2$ to 1000 $\mu m^2$.

9. The thin film transistor array substrate of claim 1, wherein the semiconductor pattern has the same shape as the data line assembly except for the channel portion between the source electrodes and the drain electrodes.

10. The thin film transistor array substrate of claim 1, wherein the gate line assembly further comprises gate pads, and the data line assembly further comprises data pads.

11. The thin film transistor array substrate of claim 10, further comprising subsidiary gate pads formed on the gate pads and subsidiary data pads formed the data pads.

12. The thin film transistor array substrate of claim 11, wherein the subsidiary gate pads, the subsidiary data pads and the pixel electrodes are derived from the same layer.

13. A liquid crystal display, comprising:
a substrate;
a plurality of gate lines extending in a row direction;
a semiconductor pattern covering the gate lines;
a plurality of data lines extending in a column direction, wherein the data lines and the gate lines define pixel regions;
a plurality of source electrodes formed on the semiconductor pattern;
a plurality of drain electrodes formed on the semiconductor pattern;
a plurality of pixel electrodes formed in the respective pixel regions;
a protective layer covering the data lines and being in direct contact with an upper surface of the semiconductor pattern between the source electrode and the drain electrode;
a plurality of storage capacitance lines overlapped with the respective pixel regions; and
a plurality of extensions provided to the respective pixel regions, each extension being extended from the pixel electrode corresponding thereto and overlapping the gate line on a previous row.

14. The liquid crystal display of claim 13, wherein the storage capacitance lines are extended parallel to the gate lines in the row direction.

15. The liquid crystal display of claim 13, wherein the extensions have a ring shape.

16. The liquid crystal display of claim 13, wherein a portion of the gate lines overlapped by the extension is narrower than other portions thereof.

17. The liquid crystal display of claim 13, further comprising a plurality of conductive patterns formed between the extensions and the gate lines of the previous rows.

18. The liquid crystal display of claim 17, wherein the conductive patterns are formed on the same plane as the data lines.

19. The liquid crystal display of claim 13, wherein a size of an overlapped area between each extension and the gate line of a previous row is in a ranged from 5 $\mu m^2$ to 1000 $\mu m^2$.

20. The liquid crystal display of claim 13, further comprising a plurality of storage capacitor conductive patterns overlapping the respective storage capacitance lines, and connected to the respective pixel electrodes.

21. The liquid crystal display of claim 13, further comprising:
a plurality of gate pads connected to the plurality of gate lines, respectively; and
a plurality of data pads connected to the plurality of data lines.

22. The liquid crystal display of claim 21, further comprising:
a plurality of subsidiary gate pads formed on the plurality of gate pads; and
a plurality of subsidiary data pads formed on the plurality of data pads.

23. The liquid crystal display of claim 22, wherein the plurality of subsidiary gate pads, the plurality of subsidiary data pads and the plurality of pixel electrodes are derived from the same layer.

24. A thin film transistor array substrate for a liquid crystal display, comprising:
a substrate;
a gate line assembly formed on the substrate and comprising gate lines extending in a row direction, and gate electrodes connected to the gate lines;
a storage capacitor line assembly extending in the row direction;
a gate insulating layer formed on the substrate and covering the gate lines and the storage capacitor line assembly;
a semiconductor pattern formed on the gate insulating layer over the gate electrodes;
a data line assembly formed on the gate insulating layer, the data line assembly comprising:
data lines crossing over the gate lines, the data lines and the gate lines define pixel regions;
source electrodes formed on the semiconductor pattern and connected to the data lines; and
drain electrodes formed on the semiconductor pattern and facing the source electrodes around the gate electrodes;
a protective layer covering the data line assembly and the semiconductor pattern, the protective layer having first and second contact holes;
pixel electrodes formed on the protective layer at the respective pixel regions such that the pixel electrodes are connected to the drain electrodes through the first contact holes; and
repair members provided corresponding to the pixel regions, wherein each repair member is extended from the gate line of the adjoining pixel region on the previous row and overlaps the pixel electrode of the corresponding pixel region.

25. The thin film transistor array substrate of claim 24, further comprising storage capacitor conductive patterns formed on the gate insulating layer and overlapping the storage capacitor line assembly, the storage capacitor conductive patterns connected to the pixel electrodes through the second contact holes.

26. The thin film transistor array substrate of claim 24, wherein the storage capacitor line assembly comprises:
double storage capacitor electrode lines horizontally formed at the top and the bottom of each pixel region; and
storage capacitor electrodes vertically formed at the periphery of the pixel region while interconnecting the storage capacitor electrode lines.

27. The thin film transistor array substrate of claim 24, wherein a size of an overlapped area between the repair member and the pixel electrode of a subsequent row is ranged from 5 $\mu m^2$ to 1000 $\mu m^2$.

28. The thin film transistor array substrate of claim 24, wherein the semiconductor pattern has the same shape as the data line assembly except for the channel portion between the source electrodes and the drain electrodes.

29. The thin film transistor array substrate of claim 24, wherein the gate line assembly further comprises gate pads, and the data line assembly further comprises data pads.

30. The thin film transistor array substrate of claim 29, further comprising subsidiary gate pads formed on the gate pads and subsidiary data pads formed the data pads.

31. The thin film transistor array substrate of claim 30, wherein the subsidiary gate pads, the subsidiary data pads and the pixel electrodes are derived from the same layer.

32. A liquid crystal display, comprising:
a substrate;
a plurality of gate lines extending in a row direction;
a plurality of data lines extending in a column direction, wherein the data lines and the gate lines define pixel regions;

a plurality of pixel electrodes formed in the respective pixel regions;

a plurality of storage capacitance lines overlapped with the respective pixel regions; and a plurality of extensions provided to the respective pixel regions, wherein each extension is extended from the gate line on the previous row and overlapping the pixel electrode of the respective pixel region.

33. The liquid crystal display of claim 32, wherein the storage capacitance lines are extended parallel to the gate lines in the row direction.

34. The liquid crystal display of claim 32, wherein a size of an overlapped area between each extension and the pixel electrode of a subsequent row is in a ranged from 5 $\mu m^2$ to 1000 $\mu m^2$.

35. The liquid crystal display of claim 32, further comprising a plurality of storage capacitor conductive patterns overlapping the respective storage capacitance lines, and connected to the respective pixel electrodes.

36. The liquid crystal display of claim 32, further comprising:

a plurality of gate pads connected to the plurality of gate lines, respectively; and a plurality of data pads connected to the plurality of data lines.

37. The liquid crystal display of claim 36, further comprising:

a plurality of subsidiary gate pads formed on the plurality of gate pads; and a plurality of subsidiary data pads formed on the plurality of data pads.

38. The liquid crystal display of claim 37, wherein the plurality of subsidiary gate pads, the plurality of subsidiary data pads and the plurality of pixel electrodes are derived from the same layer.

* * * * *